US012784424B2

(12) United States Patent
Bastuck

(10) Patent No.: US 12,784,424 B2
(45) Date of Patent: Nov. 3, 2026

(54) METHOD AND APPARATUS FOR DETECTING ANOMALIES IN TWO-DIMENSIONAL DIGITAL IMAGES OF PRODUCTS

(71) Applicant: WIPOTEC GmbH, Kaiserslautern (DE)

(72) Inventor: Manuel Bastuck, Kaiserslautern (DE)

(73) Assignee: WIPOTEC GmbH (DE)

( * ) Notice: Subject to any disclaimer, the term of this patent is extended or adjusted under 35 U.S.C. 154(b) by 233 days.

(21) Appl. No.: 18/653,041

(22) Filed: May 2, 2024

(65) Prior Publication Data

US 2024/0371143 A1 Nov. 7, 2024

(30) Foreign Application Priority Data

May 4, 2023 (DE) ..................... 10 2023 111 681.9

(51) Int. Cl.
*G06V 10/776* (2022.01)
*G06T 7/00* (2017.01)
(Continued)

(52) U.S. Cl.
CPC .......... *G06V 10/776* (2022.01); *G06T 7/0004* (2013.01); *G06T 7/60* (2013.01);
(Continued)

(58) Field of Classification Search
CPC ....... G06V 10/776; G06T 7/0004; G06T 7/60; G06T 11/00; G06T 2207/10116;
(Continued)

(56) References Cited

U.S. PATENT DOCUMENTS 7,783,433 B2 * 8/2010 Gordon ..................... G06T 5/70 700/175
2003/0076989 A1 * 4/2003 Maayah ................ G06T 7/0004 382/145
(Continued)

FOREIGN PATENT DOCUMENTS

CN 111798412 10/2020
EP 4287116 12/2023
(Continued)

OTHER PUBLICATIONS

Benstock, D et al., "Extreme Value Analysis (EVA) Of Inspection Data And Its Uncertainties," NDT&E International 87, Jan. 26, 2017, pp. 68-77.
(Continued)

*Primary Examiner* — Utpal D Shah
(74) *Attorney, Agent, or Firm* — Pandiscio & Pandiscio

(57) ABSTRACT

The invention relates to a method for detecting anomalies in digital images of products. A digital image is divided into regions, wherein a region is detected as a maximum anomaly if the value of the at least one property is greater than a predetermined maximum threshold value, or as a minimum anomaly if the value of the at least one property is less than a predetermined minimum threshold. In a test process, a plurality of digital bad images is generated from real or fictitious bad products, each which of which has at least one already known anomaly. Every bad image is divided into regions and the maximum value of the relevant property of the regions is determined as the maximum sample value of a maximum value sample or a minimum sample value of a minimum value sample. A detection rate for the at least one already known anomaly is determined from a sample generated in this way. For this purpose, according to one alternative, a suitable predetermined probability density function for describing the maximum value sample or the
(Continued)

minimum value sample is parameterized using a statistical estimation method. The detection rate can thereby be calculated by integrating the parametrized probability density function using the predetermined maximum threshold value or the minimum threshold value as an integration limit. According to another alternative, the detection rate can be determined as a ratio of the number of values of the maximum value sample or the minimum value sample, which are greater than or equal to the predetermined maximum threshold value or less than or equal to predetermined minimum threshold value, and the total number of values of the maximum value sample or the minimum value sample. The detection rate that is detected in this manner can then be assigned to the at least one already known anomaly.

14 Claims, 7 Drawing Sheets

(51) Int. Cl.
*G06T 7/60* (2017.01)
*G06T 11/00* (2026.01)

(52) U.S. Cl.
CPC ..... *G06T 11/00* (2013.01); *G06T 2207/10116* (2013.01); *G06T 2207/20021* (2013.01); *G06T 2207/20076* (2013.01); *G06T 2207/20081* (2013.01); *G06T 2207/30108* (2013.01)

(58) Field of Classification Search
CPC . G06T 2207/20021; G06T 2207/20076; G06T 2207/20081; G06T 2207/30108; G06T 2200/24; G06T 2207/30128; G06T 2207/30164; G06T 7/62; G06T 2207/30121
See application file for complete search history.

(56) References Cited

U.S. PATENT DOCUMENTS

| | | | | |
|---|---|---|---|---|
| 2007/0098245 | A1* | 5/2007 | Mylaraswamy | G06T 7/0004 382/199 |
| 2008/0289423 | A1* | 11/2008 | Gordon | G06T 5/73 73/602 |
| 2011/0182495 | A1* | 7/2011 | Sun | G06T 7/48 382/141 |
| 2013/0085715 | A1* | 4/2013 | Lakshminarayan | G06F 18/00 702/179 |
| 2019/0342306 | A1* | 11/2019 | Strauss | H04L 63/1416 |
| 2022/0415020 | A1* | 12/2022 | Kashanipour | G01N 23/18 |

FOREIGN PATENT DOCUMENTS

| | | | |
|---|---|---|---|
| JP | 2021140739 | 9/2021 | |
| WO | WO 2021/137745 | 7/2021 | |
| WO | WO-2021137745 A1 * | 7/2021 | G06T 7/0004 |

OTHER PUBLICATIONS

Mullany, B et al., "The Implication And Evaluation Of Geometrical Imperfections On Manufactured Surfances," CIRP Annals—Manufacturing Technology 71, Jul. 30, 2022, pp. 717-739.

* cited by examiner

METHOD AND APPARATUS FOR DETECTING ANOMALIES IN TWO-DIMENSIONAL DIGITAL IMAGES OF PRODUCTS

REFERENCE TO PENDING PRIOR PATENT APPLICATION

This patent application claims benefit of German Patent Application No. 10 2023 111 681.9, filed May 4, 2023, which patent application is hereby incorporated herein by reference.

FIELD OF THE INVENTION

The invention relates to a method for detecting anomalies in digital images of products having the features of the preamble of patent claim 1. Moreover, the invention relates to an apparatus as well as a computer program product for carrying out the method.

BACKGROUND OF THE INVENTION

When products are being manufactured, there is often a desire or need for the manufactured products to then undergo an examination so see whether the product has any anomalies, in particular imperfections, foreign bodies or the like. For example, in the food industry when producing yogurt or cheese, the task of examining the finished product can be set to see whether undesired foreign bodies or other undesired material regions are present in the product. To solve this problem, inspection devices are used in practice which irradiate the product with electromagnetic radiation, in particular with radiation in the x-ray spectrum. In this way, a digital image of the product is generated, which contains not just information about the external geometric dimensions or the surface of the product, but also about the interior of the product. Depending on their damping, to-be-detected anomalies can produce, as compared to the image regions that do not show evidence of any anomalies (called "good regions" in the following), image regions during irradiating that have a higher or lower gray scale value (i.e., pixel value) than the good regions. In the present description, the term "gray scale value" is used for the information that the detector generates as a function of the radiation power incident on the individual pixels or the corresponding radiation energy that is detected during the relevant exposure time, independent of the color or the manner in which the pixel values are depicted in the relevant digital image.

Apparatuses or methods are also known for this type of inspection of products, in which the product to be examined is not completed irradiated (i.e., the source of radiation and the detector are located at opposite sides of the product), but in which the radiation penetrates deep enough into the product being examined and is "reflected" in the product, wherein this "reflection" is physically caused by a dispersion of the radiation penetrating in a volume region or by generating a fluorescent radiation in the volume region. In the case of these types of inspection devices, the source of radiation and the detector can be located on the same side of the product to be examined.

The product to be examined can be present in this case in the form of piece goods of any kind or even as bulk goods, which are conveyed through the inspection device by means of a conveyance device.

Line detectors having one or more detector lines each with a predetermined number of pixels are frequently used as detectors for irradiation in production lines, in which the products to be examined are moved along a conveyance path. In the process, the products are normally moved at a constant speed through a scanning apparatus, wherein a digital image is composed of a plurality of detected lines. However, it is also possible of course to use an area scanner instead of a line scanner. In this case, the digital image of the product being examined is recorded by means of a detection process (i.e., of a single exposure process).

Digital images that are generated in this way are normally examined in an automated manner to see whether anomalies are present in the relevant product. In doing so, the image generated directly by means of the scan process that was carried out can be edited or processed before such an examination. To this end, the original image is digitally filtered for example, wherein the filter used for this can bring produce a contrast enhancement.

It is also possible, already when generating the images to take measures to improve the contrast, in particular with respect to a detection of anomalies. For example, a dual-energy method could be used, wherein the two spectra are selected so that a contrast enhancement is yielded by overlapping the relevant partial images.

It is likewise possible to use spectrally resolving detectors, which generate a plurality of images, wherein every image is composed of pixels, whose gray scale value of the radiation energy corresponds in respectively a specific spectral section of the detected radiation. For the detection of anomalies, an image can then be used, which is generated from all or selected partial images of such a spectrally resolving detector, for example by weighted addition of the relevant pixel values. However, every partial image can also be examined separately to see whether an anomaly is present.

Methods are known for the automated examination of the digital image of the product, in which a threshold value is defined, wherein an anomaly can then be present, if the gray scale value of at least one pixel is greater than the threshold value. To this end, in a learning process, normally a predetermined number of good products (i.e., products, that do not have an anomaly) of the same product type are scanned in order to obtain information about the maximum gray scale values that typically occur in such good products. Depending on this, the threshold value is then defined so that a predetermined value for the false reject rate is complied with (for example one percent or one per thousand). The false reject rate in this case is the probability, with which a good product is identified as a "bad product". This (theoretic) false reject rate can be checked by determining the empirical frequency with which a good product is identified as a bad product. To this end, an adequate number of digital images of good products can be generated, and checked with the use of the defined threshold value, wherein the empirical false reject rate is determined as the quotient of the good products identified as a bad product [divided] by the total number of good products.

Determining such a threshold value also requires a time-consuming learning process, in which a relatively high number of digital images of good products must be generated. However, this is disadvantageous because first of all such a number of good products must be generated via the relevant production line, i.e., production time is correspondingly lost. In addition, it is difficult to predict how high the number of good products required for the learning process must be in order to be able to reliably define the threshold value so that the desired false reject rate is met.

The non-prepublished European patent application with application number 23166616 describes a method for detecting anomalies in digital images, according to which an automated process can be carried out for defining a threshold value also when using a low number of digital images. According to this method, a threshold value is determined for the detection of anomalies in digital images of products in a learning process with good reliability. In doing so, an assumption is made about the statistical distribution of the highest and lowest values (called extreme values in the following) of a specific variable, which is used for the detection of anomalies in digital images to be examined. This distribution of the extreme values is described adequately well with a predetermined, to-be-parameterized probability density function (the term "parameterize" in this description denotes the determining or defining of values for parameters of a probability density function that have not already been defined). In other words, the assumption is made that the elements of the sample (i.e., the quantity of the relevant maximum or minimum) satisfy the respective predetermined probability density function or the probability of occurrence thereof can be well described by this probability density function. Using the elements of the sample, estimated values are determined for all to-be-determined parameters (i.e., for all parameters that might not already be predetermined) of the probability density function. According to this method, in particular the generalized extreme value distribution, for example a predetermined variant thereof, that is a Weibull distribution, a Fréchet distribution or a Gumbel distribution, is used as used as the to-be-parameterized probability density function, in order to describe the distribution of the maximum or minimum values of the specific variable.

In this case, this method is not limited to the case explained at the outset, in which the pixel values, in particular every individual pixel value, in conjunction with a threshold value for the pixel values, are used for the decision whether the digital image being examined contains an anomaly.

In fact the invention generalizes the principle underlying this procedure. The image to be examined is divided into one or more regions, wherein at least the same one property or the same multiple properties are assigned to every region. Every region thereby comprises either exactly one or several pixels, wherein several pixels are only assigned to the same region if they are adjacent (i.e., every pixel of the region has at least one directly adjacent pixel of the same region). Viewed as adjacent to a pixel under consideration in this case is every pixel which is adjacent with an edge to an edge of the pixel under consideration (i.e., the pixel above, below, to the left and right of the pixel under consideration), or (additionally) every pixel which is adjacent with a corner to a corner of the pixel under consideration (i.e., the pixels in the extension of the diagonals of the pixel under consideration). A value describing the respective property is determined for every property of the previously defined regions. If several properties are assigned to the regions, then either separate values can be determined for each property or the values of two or more properties are linked to form a combined value, for example by an arithmetic operation (e.g., multiplication or division or weighted addition).

The detection of anomalies takes place in the case of this generalization by determining a threshold value for every property or for every combination of several properties.

In an extreme case, the entire image can be regarded or defined as one region. In this case, if the pixel value of every pixel is still examined, as a specific variable for detecting anomalies, to see whether the value exceeds or falls short of a predetermined threshold value for the pixel value, then this produces the same result, as when each pixel is regarded or defined as a region with exactly one pixel. In this case, the previously explained generalization with the use of the predefined regions and assigned optional properties, again leads to the standard procedure, according to which the individual pixels are examined with respect to their pixel values to see whether they exceed or fall short of a threshold value for the pixel values.

The determination of the threshold value for one property or the of the threshold value for a combination of properties takes place according to the invention in a learning process. The images required for the determination of the threshold value can already be generated in advance in an adequately predetermined number or as needed, i.e., one or more new digital images are generated in succession until an adequate number is reached.

According to this known method, the learning process or the automated process for determining the threshold value for the at least one property is carried out with the use of the digital images of good products that do not show evidence of any anomalies. As already mentioned in the foregoing, the images, which can be a direct result of a scanning process, are first of all edited, or processed for the detection process. In doing so, an appropriate section of an identified overall image can also be generated, which comprises the product as a whole or predetermined partial regions. The section generated in this manner or even the entire captured digital image can also undergo a digital filtering, for example, to produce a contrast enhancement with the objective of highlighting anomalies even more. If a continuously produced product or a bulk product is supposed to be checked for anomalies, then digital images of sections of such a product can be generated and they can be processed and checked just as is possible with images of isolated products (or sections of such products).

It is mentioned at this point that it is not absolutely necessary to carry out the automated process exclusively with good products. In fact, the automated process can also be carried out with images of products, as they are generated on a production line, without it being ensured that none of the products constitutes a bad product. Instead of good products, even those products designated as "good process products" can therefore be used, wherein a number of good process products consists predominantly of good products and only to a smaller extent of bad products. This is because in practice, it must be assumed that the proportion of bad products in the number of good process products is low, in particular less than 25%, preferably less than 10%, highly preferably less than 5%.

As a part of the automated process, either a fixedly predetermined number of digital images or a number of images of good products or good process products to be determined in the course of the automated process are generated or used.

The one or more regions are defined for each of the digital images, and the value of the at least one property or the combined value for the several properties is determined for each of the digital images. The maximum value of these values is determined as the maximum sample value of a maximum value sample and/or the minimum value of these values is determined as the minimum sample value of a minimum value sample.

In doing so, such extreme values that are implausible or clearly point to a mistake are excluded. For example, when determining the extreme values, those pixel values that have an absolute maximum value or an absolute minimum value of the gray value scale that is used are excluded, because a corresponding minimum value, for example a value of 0, can indicate a defective pixel of the detector and a maximum value can indicate an overdriven pixel of the detector.

The extreme values that are determined in this way represent the aforementioned sample and can be stored in a list for example (possibly separately for the minimum values and maximum values).

Then, with the use of the maximum sample values, estimated values are determined for all free, non-predetermined parameters of the predetermined probability density function for describing the maximum value sample and/or, with the use of the minimum sample values, estimated values are determined for all free, non-predetermined parameters of the predetermined probability density function for describing minimum value sample. A statistical estimation method is used for this.

Since a meaningful result of a statistical estimation method, in particular when using an estimation function (also called a statistical estimator), is only to be anticipated if the sample comprises a minimum number of values, typically such a minimum number is specified, which, in turn, necessitates a corresponding minimum number of digital images.

An essential point of this known method consists of a rate being specified, with which a maximum anomaly is incorrectly detected in the images being examined (when carrying out the method using the threshold value), or a rate, with which no maximum anomaly is correctly detected in the images being examined (when carrying out the method using the threshold value), and/or that a rate is specified, with which a minimum anomaly is incorrectly detected in the images being examined (when carrying out the method using the threshold value), or a rate, with which no minimum anomaly is correctly identified in the images being examined (when carrying out the method using the threshold value). The to-be-determined maximum or minimum threshold value can also be determined so that the predetermined rate is met.

The term "rate" is understood in this case as the quotient of the number of good products, which satisfy the relevant rate criterion when applying the test, and a predetermined total number of good products or process products. The rate, with which a maximum or minimum anomaly is incorrectly detected in the images being examined, therefore, corresponds to the term "false reject rate" frequently used in practice. The rate, with which a maximum or minimum anomaly is incorrectly detected in the images being examined, and the rate, with which no maximum or minimum anomaly is correctly detected in an image being examined, each yield in sum 1. During the operation of a system, these rates can also be determined as a sliding value, that is e.g., via the number N of the most recently examined products.

If the predetermined probability density function is parameterized by means of the estimation method, then the maximum threshold value can be determined with the use of the previously parameterized probability density function or a distribution function corresponding thereto in such a way that the probability of the occurrence of a maximum value, which is greater than or equal to the maximum threshold value, corresponds to the relevant predetermined rate, with which a maximum anomaly is incorrectly detected in the images being examined, or that the probability of the occurrence of a maximum value, which is less than or equal to the maximum threshold value, corresponds to the predetermined rate, with which no maximum anomaly is correctly detected in the image being examined. In other words, the maximum threshold value can be determined so that the area under the probability density function above the maximum threshold value or the area under the probability density function below the maximum threshold value corresponds to the relevant predetermined rate.

Analogously, the minimum threshold value can be determined with the use of the previously parameterized probability density function or a distribution function corresponding thereto in such a way that the probability of the occurrence of a minimum value, which is less than or equal to the minimum threshold value, corresponds to a predetermined rate, with which a minimum anomaly is incorrectly detected in the images being examined, or that the probability of the occurrence of a minimum value, which is greater than or equal to the minimum threshold value, corresponds to a predetermined rate, with which no minimum anomaly is correctly identified in a good product. In other words, the minimum threshold value can be determined so that the area under the relevant probability density function below the minimum threshold value or the area under the probability density function above the minimum threshold value corresponds to the relevant predetermined rate.

In order to determine the area, the integral of the probability density function can of course be used, wherein the integral is to be formed from the relevant threshold value up to an upper limit of the interval of definition of the probability density function (e.g., infinitely or a predetermined upper limit value, above which the value of the integral, i.e., the area, only changes even less than a predetermined error bound) or from a lower limit of the interval of definition (e.g., minus infinity or a predetermined lower limit value, below which the value of the integral, i.e., the area, only changes even less than a predetermined error bound) up to the threshold value.

Of course, instead of calculating the integral as outlined above, the distribution function of the relevant probability density function can also be utilized, since the distribution function represents the value of the integral of the probability density function from minus infinity or the lower limit of the interval of definition of the probability density function up to the relevant threshold value. The relevant area under the probability density function, i.e., the value of the integral or the value of the distribution function, therefore corresponds to the (theoretic) probability, with which a maximum or minimum value of a property of the regions of an image of a good product is less than or equal to the relevant threshold value. If the probability with which a maximum or minimum value greater than or equal to the threshold value is supposed to be calculated, then to do so merely the so calculated probability must be subtracted from 1.

Since the value of the area or of the integral or of the distribution function is specified for these calculations, the corresponding inverse function must be used. These calculations can either take place analytically or by means of a numeric method.

According to this known method, the regions can be defined by means of a basic threshold value, wherein adjacent pixels, whose pixel value is greater than (or equal to) the basic threshold value, form a first group of regions, and adjacent pixels, whose pixel value is less than the basic threshold value, form a second group regions. The first and second group[s] of regions can also be combined into a single group. Another possibility for defining the regions consists of using a predefined (geometric) mask. For example, a matrix-like mask can be used, which puts e.g., a square grid (i.e., a chessboard-like grid) over the digital image, wherein all pixels inside a square form a region. Of course, the mask can also produce other subdivisions, wherein the entire image does not have to be divided into regions.

A property that can be described with a value is assigned to the regions. In doing so, this can be geometric properties in particular, such as the area, the circumference or the diameter of the regions (if these are at least approximately circular), or pixel value properties, which are described by a value, which is yielded from the pixel values of the relevant region, such as e.g., the maximum or minimum value of a region, the average value or the variance of the pixel values.

Several properties can also be combined, which can then be described by a combined value. For example, the mean value and the standard deviation can be added, wherein this information represents a kind of confidence interval for the pixel values. The difference of the maximum and minimum can also be used as a combined value, which describes the brightness difference of the region. Since this measure is sensitive to outliers, quantiles can be used instead, for example the quantiles at 10% and 90% as an alternative to the maximum and minimum. Furthermore, the quotient of the circumference and the area can be used to ascertain how circular the region is or how much it deviates from a circularity. However, geometric and pixel value properties can also be combined.

This know method therefore offers the possibility of specifying a rate, in particular a false reject rate (or the relevant complementary rate, i.e., the rate with which the images are correctly identified as error-free) and, as a function of this, determining a threshold value for identifying a minimum or maximum anomaly.

However, in practice it is often desirable or necessary to also know the actual detection rate or at least its predicted value along with the false reject rate. Whereas the actual false reject rate can be determined relatively simply in practice, but in a way that is also time consuming via a manual individual assessment of actually rejected products, this is hardly possible for the detection rate. To this end, it is known for example to examine images of actual bad products to see whether the anomalies contained therein can be identified with an already known threshold value with sufficient certainty or probability, i.e., a sufficiently high detection rate.

SUMMARY OF THE INVENTION

Proceeding from this prior art, the object of the invention is to create a method for detecting anomalies in digital images of products, which makes determining at least one estimated value for the detection rate for the detection of anomalies possible in a simple manner and with low effort. Furthermore, the object of the invention is to create an apparatus as well as a computer program product for carrying out the method.

The invention attains this object with the features of Patent claim 1 and/or 14 and 15. Additional embodiments of the invention are disclosed in the dependent claims.

The invention proceeds from the realization that by creating digital images of similar products (or of a similar product when dealing with a continuously produced product such as bulk goods), in which at least one already known anomaly is contained, which is generated by an already known (physical or virtual) interfering object, a statement can be made about the detection rate to be anticipated during active operation of a inspection device or an estimated value for it can be determined.

Similar products should understood in this case as those products, which are manufactured in the course of a series production, for example yogurt filled in cups or cookies packaged in bags or sturdy boxes or the like. During the inspection of these types of products, it must be ascertained whether undesired interfering objects are contained therein, for example impurities, metal splinters, little stones, bone splinters or the like. In the process, the inspection device normally creates digital images of the products, which are then examined by a suitable automated analysis for the presence of anomalies that are caused by the undesired interfering objects.

For this purpose, the digital image is regarded as a single region or subdivided into several regions, wherein every region consists of one or more adjacent pixels. For every such region, a value is determined for at least one property of the region or a combined value for several properties of the region. For example, an average brightness value (gray scale value) can be determined for the region. The presence of an anomaly is identified if the relevant value of the property is greater than an predetermined maximum threshold value or than a predetermined minimum threshold value.

As already mentioned in the foregoing, the maximum threshold value or the minimum threshold value can be directly predetermined or be determined in accordance with the method according to the European patent application with application number 23166616 from a default value for the false reject rate (or the rate that is complementary hereto).

According to the invention, the following steps are executed in a test process:

- generating a plurality of digital bad images of real or fictitious bad products, each of which has at least one already known anomaly;
- defining, for every bad image, the region or the regions and determining the value of the at least one property or of the combined value for several properties of each region and determining the maximum value of these values as a maximum sample value of a maximum value sample or determining the minimum value of these values as a minimum sample value of a minimum value sample;
- determining a detection rate for the at least one already known anomaly
  - by determining estimated values for all free, non-predetermined parameters of a predetermined probability density function for describing the maximum value sample or the minimum value sample (parametrizing) using the maximum sample values or the minimum sample values and using a statistical estimation method, and
  - by integrating the parameterized probability density function using the predetermined maximum threshold value or minimum threshold value as an integration limit, or
- determining a detection rate as a ratio of the number of values of the maximum value sample or the minimum value sample, which are greater than or equal to the predetermined maximum threshold value or less than or equal to the predetermined minimum threshold value, and the total number of values of the maximum value sample or of the minimum value sample; and
- assigning the detection rate to the at least one already known anomaly.

Assigning the thereby determined detection rate to the at least one already known anomaly provides the operating person of an inspection device, for example an x-ray inspection device, in which this method is implemented, with the advantage that the effect of the preceding threshold value or the false reject rate on which this threshold value is based (as a predetermined variable) on the detection rate is immediately identifiable.

In this way, the threshold value or the false reject rate can be selected so that the detection rate for already known anomalies in images of good products, which are supposed to be examined with the inspection device during practical operation in reality for the presence of anomalies that are not already known, satisfies economic requirements and the requirements for safety to the extend possible. For these two parameters must frequently be balanced again each other. Of course, a false reject rate of 0% and a detection rate of 100% are desirable, something that is hardly or not at all possible in practice. In economic respects, the lowest possible false reject rate is desirable. This can be achieved for the detection of maximum anomalies by a threshold value that is as high as possible, but in exchange reduces the detection rate or the probability of an applicable detection of a maximum anomaly. If the to-be-detected interfering objects are hazardous objects, for example metal splinters or bone splinters in food, the detection rate needs to be correspondingly high, for example 99% or above, in order to avoid, as much as possible, claims for compensation from final consumers who are injured by the ingestion of food contaminated in this manner. On the other hand, a false reject rate that is too high can be extremely disadvantageous for the manufacturer of products, if the effort of a manual re-inspection of erroneously rejected inspected products is time consuming and therefore cost intensive.

With the invention, it is possible to define the false reject rate, on the one hand, and the detection rate, on the other, by specifying a single parameter, namely either directly the respective maximum threshold value or minimum threshold value or the false reject rate (or the rate complementary hereto) so simply and quickly that this satisfies the requirements for cost effectiveness and/or safety.

In practice this method of course will supply even more applicable results, the better the already known anomalies coincide with the anomalies that actually occur or the already known (physical or virtual) interfering objects coincide with the interfering objects that actually occur.

According to an embodiment of the invention, the maximum threshold value or the minimum threshold value is determined in a learning process, wherein the following steps are executed:

- generating or using a number of digital images of good products that do not contain an anomaly, or of good process products, which predominantly do not contain an anomaly, wherein the number of images is predetermined or is determined in the course of the learning process;
- defining, for each of the digital images, the region or the regions and determining the value of the at least one property or of the combined value for several properties of each region and determining the maximum value of these values as a maximum sample value of a maximum value sample and/or determining the minimum value of these values as a minimum sample value of a minimum value sample;
- determining, with the use of a statistical estimation method, the estimated values for all free, non-predetermined parameters of a predetermined probability density function for describing the maximum value sample using the maximum sample values and/or determining the estimated values for all free, non-predetermined parameters of a predetermined probability density function for describing the minimum value sample using the minimum sample values;
- specifying a first rate, with which a maximum anomaly is incorrectly detected in the images being examined, or a second rate, with which no maximum anomaly is correctly identified in the images being examined, and/or specifying a third rate, with which a minimum anomaly is incorrectly detected in the images being examined, or a fourth rate, with which no minimum anomaly is correctly identified in the images being examined,
- determining the maximum threshold value using the parameterized probability density function or a distribution function corresponding thereto so that the probability of the occurrence of a maximum value that is greater than or equal to the maximum threshold value corresponds to the predetermined first rate or that the probability of the occurrence of a maximum value that is less than or equal to the maximum threshold value corresponds to the predetermined second rate, and/or
- determining the minimum threshold value using the parameterized probability density function or a distribution function corresponding thereto so that the probability of the occurrence of a minimum value that is less than or equal to the minimum threshold value corresponds to the predetermined third rate or that the probability of the occurrence of a minimum value that is greater than or equal to the minimum threshold value corresponds to the predetermined fourth rate.

In this case, it is basically the method described in the European patent application with application number 23166616, wherein the false reject rate or the rate complementary hereto is specified. The advantage of this method is that with respect to the direct specification of the threshold value, it is evident that in this case one of the variables that are relevant in practice, namely the false reject rate, is specified and not an initially arbitrary threshold value, the effect of which on both the false reject rate as well as on the detection rate cannot be readily predicted.

According to an embodiment of the invention, a geometric property is used as the property of a region, which is determined from the location information of the pixels of the region, in particular the area, the circumference or the diameter. Furthermore, a pixel value property that is determined from the values of the pixels of the region can be used as the property of a region, in particular the maximum value or the minimum value of all pixels of the region, the mean value, the variance or the standard deviation.

In practice, a variable is used as the property of a region, the use of which most reliably detects the (not already known) interfering objects to be detected during practical operation of an inspection device or during practical use of the method according to the invention or the (not already known) anomalies caused thereby.

If the maximum threshold value or the minimum threshold value is not directly specified, but is determined from a predetermined false reject rate, then the generalized extreme value distribution, in particular of its special cases, the Gumbel distribution, the Weibull distribution or the Fréchet distribution, can be selected or used as the predetermined probability distribution required for this. This is because the generalized extreme value distribution is exceptionally well-suited to describe probability distributions of extreme values occurring in practice.

According to an embodiment of the invention, the digital bad images required for the test process are generated in such a way that the at least one predetermined anomaly is located at a predetermined position within the bad image. As a result, this information and optionally also the geometry of the interfering object causing at least one predetermined anomaly are used for determining the maximum sample value or minimum sample value representing this predetermined anomaly.

For example, the interfering object generating the at least one predetermined anomaly can be positioned in such a way on or in the good product to be inspected (which constitutes a bad product after attaching or introducing the interfering object) that it is located in the upper right quarter of the relevant digital image—in an image plane perpendicular to the irradiation direction. Detecting the respective maximum or minimum sample value can then be restricted to this upper right quarter of the digital image for example. This reduces the probability that a sample value, which is greater or less than the maximum or minimum sample value that is actually caused by the anomaly or the relevant interfering object, is determined in the digital image in a region outside the predetermined anomaly.

The region actually used for the image analysis or the image section actually used can also be determined with the use of a basic threshold value. Thus, for example, all regions of an image can be determined whose pixel values are greater than or equal to the predetermined basic threshold value. Then it is possible to check whether there is a sufficiently large overlap between a region determined in this way and the already known geometric exterior dimensions of the relevant interfering object (or its geometric exterior dimensions in a projection in the image plane). For example, it can be checked to see whether the interfering object with its entire projection surface is within a region determined in this manner or with a proportion of more than a predetermined overlap threshold value.

As already mentioned above, according to an embodiment of the invention, to generate a bad image, a good product that does not contain an anomaly can be used, wherein on or in the good product at least one interfering object is provided so that a bad product with at least one already known interfering object results from the good product. In addition, the at least one interfering object can also be provided on a carrier, which is fastened to the product or is arranged therein.

According to another embodiment of the invention, to generate a bad image, digital image data of a good product can be used, wherein the digital image data of the good product are digitally transformed with the use of known material and geometric properties of at least one predetermined interfering object for the inclusion of the at least one interfering object. In other words, an already known anomaly is "included" or "inserted" in the digital image of a good product. This variant is offered in particular when an interfering object consists of a single material and has a simple geometric structure, for example a sphere, a quad or a cube. The "inclusion" can be accomplished in the case of an inspection device that irradiates the product being inspected such that, with the use of an already known material-dependent specific damping for the irradiation, which is used for the inspection, the additional damping is determined and said additional damping is taken into consideration along with the damping that is represented by the image data of the good image. This can also take place by simple addition when using a logarithmic scale for damping.

The carrier for the at least one interfering object can be embodied to be plate-shaped or card-shaped. Several interfering objects having identical material properties, in particular from a single material, with similar geometry, but of a different size, can also be arranged in or on the carrier. Bad images with several already known anomalies can be generated in this way. The analysis can then take place so that respectively only one region determined (in the manner described in the foregoing) or one section of a bad image of the corresponding maximum or minimum threshold value determined (in the manner described in the foregoing) is used for the determination.

According to an embodiment of the invention, the detection rate can be displayed on a display device as a numeric value or a therewith related variable or identification.

The detection rate in this case can also be shown assigned to a graphic representation of the at least one interfering object and/or be shown assigned to the associated bad image. For example, with the use of already known anomalies that are caused by spheres of different sizes made of the same material (independent of whether these anomalies were generated with physical interfering objects or by "inclusion"), the relevant value of the detection rate can be displayed for every representation of a sphere with a corresponding material designation. Instead of or in addition to the representation of the interfering object, the good image or a section of the image containing the anomaly can also be represented.

According to another embodiment of the invention, the maximum threshold value or the minimum threshold value or the false reject rate (or the rate complementary hereto) for identifying a maximum or minimum anomaly can be changed by means of an input means, for example a keyboard, or an adjusting means, for example a (physical or digitally realized) slider or rotary knob. In addition, a current value for the detection rate can be displayed on the display device for every current value for the maximum threshold value or the minimum threshold value or the relevant rate.

Because of these measures, the operating person is able to develop a feeling for how and with what certainty the identification of already known interfering objects or already known anomalies occurs.

Instead of indicating the detection rate as a numeric value, it can also be evaluated by means of a classifier, for example with the use of a color code. For example, the color red can be selected for a bad detection rate (depending on the respective circumstances, for example of less than 50%), the color yellow for a still acceptable detection rate (for example of greater than or equal to 50% and less than or equal to 90%) and the color green for a high detection rate, which guarantees a sufficiently reliably detection of anomalies (for example of >90%).

A data processing device that is suitable for an apparatus according to the invention can have a processor with suitable input and output interfaces in the customary manner. The processor can be embodied for example as a special processor for industrial image processing. Of course, the processor can also be realized by a combination of a customary processor with a special image processor. The entire data processing device can also be realized as an independent CPU unit with appropriate interfaces, for example also as a slot CPU.

Reference is made at this point that all of the features of the method or apparatus described in the foregoing in accordance with European patent application with application number 23166616 can also be used in conjunction with the present invention.

BRIEF DESCRIPTION OF THE DRAWINGS

The invention will be described in more detail in the following based on the exemplary embodiments depicted in the drawing, which shows.

DETAILED DESCRIPTION OF THE PREFERRED EMBODIMENTS

Figure 1:
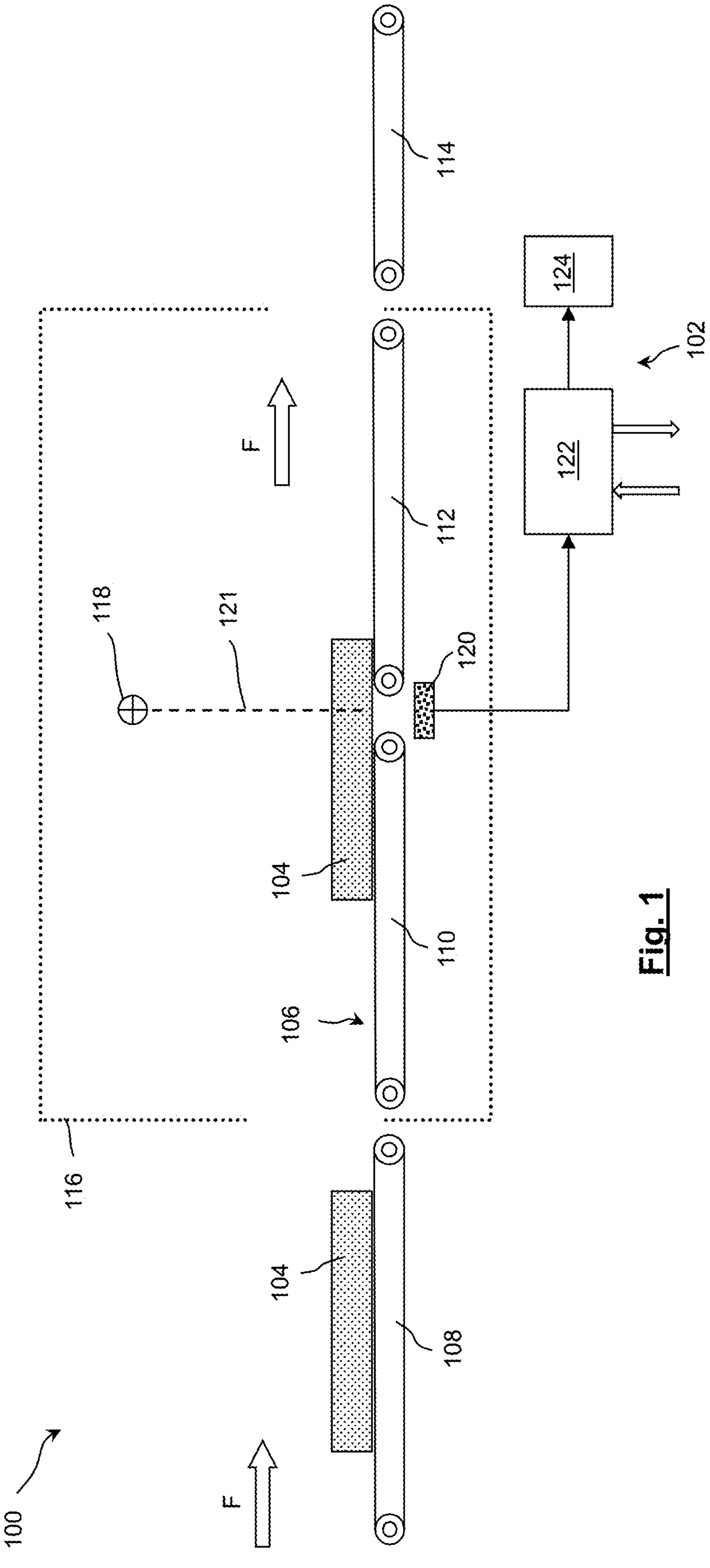
FIG. 1A schematic representation of a x-ray inspection device with an apparatus for carrying out the method in accordance with the invention.

FIG. 1 schematically depicts an x-ray inspection device 100 with an apparatus 102 for detecting anomalies in digital images, which is embodied to carry out the method described below. The x-ray inspection device 100 in this case is merely a possible example of how digital images that can contain anomalies may be generated. It is possible to use the method according to the invention on any digital images that are meant to be examined for the presence of anomalies.

As already stated in the foregoing, the digital images typically depict products, which for their part have anomalies to be detected. In the case of the x-ray inspection device shown in FIG. 1, products 104 in the form of piece goods are being examined as an example. However, it is also possible to generate digital images of any other products, for example bulk products. In this case, it is possible that digital images are generated, each of which represents a section of the bulk product.

In the case of the x-ray inspection device 100 depicted in FIG. 1, the products 104 to be examined are transported by means of a conveyance device 106 along a predetermined conveyance path (indicated by arrow F). The conveyance device 106 in this case has a plurality of transport belts 108, 110, 112, 114. The transport belt 108 is used to supply the products 104 and the transport belt 114 to convey the products away. The inspection device 100 has a shielding enclosure 116, in which the transport belts 110 and 112 are arranged, along with an x-ray radiation source 118 and an x-ray radiation detector 120. The x-ray radiation source 118 generates an x-ray beam 121, which has a fan-like shape perpendicular to the drawing plane and has a low width in the conveyance direction. The x-ray beam 121 passes through a gap or an open space between the opposing end faces of the transport belts 110 and 112 and then encounters the x-ray radiation detector 120, which, in the embodiment of the inspection device 100 depicted in FIG. 1, is arranged beneath the transport belts 110, 112. The x-ray radiation detector 120 has a width, which corresponds, in the direction perpendicular to the drawing plane, to the maximum width of the products to be examined. Typically, the width of the x-ray radiation detector is selected to be approximately as large as the width of the transport belts 110, 112. The x-ray radiation detector 120 can be embodied as a line detector, which has one or more detector lines in the direction perpendicular to the drawing plane, wherein every detector line has a predetermined number of pixels.

The apparatus 102 for detecting anomalies has an image processing unit 122, to which the signal of the x-ray radiation detector 120 is supplied. The image processing unit 122 can be embodied as a customary computer unit having one or more processors, a working memory and as the case may be a hard drive memory or SSD memory as well as appropriate interface for supplying the signal of the x-ray radiation detector 120 and for supplying or receiving and conveying away or transmitting other data. Furthermore, the apparatus 102 can have a display unit 124, on which information that is generated by the image processing unit 122 or supplied thereto can be displayed.

As schematically shown in FIG. 1, the products 104 to be examined are moved through the fan-like x-ray beam 121, whereby by means of the of the x-ray radiation detector 120, which is embodied as a line detector, a corresponding digital image signal is generated which is supplied to the image processing unit 122. The image processing unit 122 can be embodied so that initially a digital image is generated from the image signal, which in the case of a piece goods, involves the compete product 104 or at least one predetermined section. The section can be selected with customary image processing methods or pattern recognition. From the digital image generated in this way, the image processing unit 122 can subject the final digital image, which is supposed to be examined with the method described below for the presence of anomalies, also to a further image processing, for example a digital filtering, which is selected so that the to-be-detected anomalies are easier to recognize, in particular stand out better with respect to the rest of the image. This type of image pre-processing can also comprise any other image processing steps, for example a noise suppression or the like. At the end of this kind of image pre-processing (that is not absolutely necessary) is the digital image, which is then supposed to be examined for the presence of anomalies.

As stated at the outset, the use of a threshold value for the pixel values is known for detecting anomalies. The presence of an anomaly is detected in this case if a pixel value or a group of adjacent pixels with a predetermined minimum number of pixels exceeds a threshold value. If one or more anomalies are detected in a digital image, then this information can be used to trigger an action with respect to the associated product, for example diverting the product out of the flow products. Instead of this or in addition to it, the product in question can also be physically or virtually marked, i.e., by assigning appropriate data.

The display unit 124 can be used to display desired information, such as for example the digital images to be examined along with any anomalies detected therein if applicable, the threshold value that was respectively used, the type of probability density function that was selected, and the associated parameters, the quality of the fit of the probability density function to the sample, confidence intervals for the threshold values, the parameters or the rates (in particular the false reject rate) and the like. The output can of course occur in the form of data (numeric values) and/or graphs. When detection is being performed in the apparatus' normal work mode, a graph can also be displayed that depicts the progression of the current reject rate during (normal) operation of the apparatus 102 (but also during the learning process) over time, wherein the predetermined rate (e.g., the false reject rate) and the confidence interval for the predetermined rate are also depicted. Furthermore, a list with the sample values and/or a graph similar to FIG. 2 can also be depicted. In addition, representations can be displayed like those shown in FIGS. 6 to 9, in other words, information about the detection rate of predetermined anomalies that were generated by the physical or virtual interfering objects. The relevant data can naturally also be output and/or saved on an superordinate unit.

The image processing unit 122 can also be supplied with one or more initial threshold values that were already determined with the method described in the following for a product type that is just now to be examined, or other information, which is required for carrying out the method described below, for example information relating to the type of predetermined probability density function(s) to be used or information concerning the manner in which regions in a digital image to be examined are defined (see below).

As stated in the foregoing, the method explained below for detecting anomalies in digital images is not limited to an examination of whether one or more pixel values exceeds a predetermined maximum threshold value or falls short of a predetermined minimum threshold value. In fact, the method described below can be generalized for defining or determining a maximum threshold value or minimum threshold value to the effect that a maximum threshold value and/or a minimum threshold value is determined for any properties of previously defined regions in the digital images to be examined.

To do this, in a digital image to be examined, first of all the regions to which the value of a predetermined property can respectively be assigned must be defined. Defining the regions can occur, for example, so that a basic threshold value is used, wherein all pixel values that are equal to or exceed the threshold value form a first group of regions and the remaining pixel values form a second group of regions. Depending on the property that is supposed to be examined, it may suffice that respectively only the first or only the second group is further processed. This is then the case for example when only the maximum or the minimum pixel value or the average pixel value of the regions is analyzed as the property of the regions for identifying an anomaly.

However, it is also possible to assign to the regions one or more properties, which cannot just be described by individual pixel values. For example, geometric properties such as for example area, circumference, diameter (in the case of at least approximately circular regions) or the deviation of the circular shape can be assigned to a region. In such a case, an anomaly is then identified if the value of the relevant property exceeds a maximum threshold value predetermined for it or falls short of a predetermined minimum threshold value. In this general case as well, the maximum or minimum threshold values required for this can be determined with the method explained below.

Another possibility for determining the regions in a digital image to be examined consists of using a predetermined geometric mask, which is placed over the image. In this case, it can be a mask consisting of equal-sized adjacent squares of a predetermined size for example.

In this case as well, every so-defined region is assigned one or more properties, for example, the variance or the standard deviation of the pixel values that comprised the regions, the relevant average value or the maximum value or minimum value included therein.

Combined values can also be determined for every region, which are determined from two or more values for different properties. For example, a value for the variance or the standard deviation of the pixel values and an average value can be combined into a combined value, in particular using an arithmetic operation, for example (weighted) addition, which in this special case represents a kind of confidence interval, if the pixel values in this region are reasonably normally distributed. Another example of a combined value or the combination of properties of regions is the use of a difference between the respective maximum and minimum pixel value included therein. In order to be more stable against outliers, quantiles can also be used, for example 90% and 10% quantiles instead of the maximum and minimum value.

The following describes how a corresponding maximum threshold value or minimum threshold value can be determined with a low number of digital images. As mentioned above, such a learning process can be carried out with good products or good process products. The learning process can be executed for example during the initial operation of a system for manufacturing or processing products that comprises an inspection device of this sort. In doing so, it is generally necessary to determine the threshold values for every product type.

Of course, the threshold values can be stored for certain product types so that the learning process does not have to be carried out anew every time a change in the type of products to be examined is made.

It is moreover possible to carry out the learning process during the ongoing operation of a system, at least if it can be assumed that the system generates good process products, i.e., products that constitute predominantly good products (that do not contain any anomaly). Because in this case, as explained below, the bad products included in the good process products can be sorted out as outliers during the creation of the required sample.

An essential feature of the method described below for determining the threshold values consists of that, in the case of using good products (with not already known detailed information), a rate is specified, with which a maximum anomaly is supposed to be incorrectly detected in an image being examined (also called the false positive rate or false reject rate in the following) or with which no maximum anomaly is correctly identified in an image being examined (called the true negative rate). Thus, a threshold value no longer must be determined in a first step and checked in a second step to see whether a corresponding acceptable rate is yielded when using the relevant threshold value. However, it is basically also possible for the determination of the detection rate for already known anomalies described below, to directly indicate a false reject rate (false positive rate) or the true negative rate that is complementary hereto. However, in this case, an essentially greater number of digital images of good products is required to select the threshold value so that a desired false reject rate is achieved.

The required number of digital images, i.e., the number of good products or good process products can be defined beforehand, wherein however such a number must then be selected to be so great that a threshold value with the desired reliability is determined. However, it is also possible to define the required number of digital images in the course of the learning process (independent of whether the images are generated during the learning process or are already available before the start of the learning process). In doing so, it is possible to start first of all with a minimum number of digital images and increase this minimum number step-by-step by one or more digital images so long until the respectively determined threshold value is sufficiently reliable, i.e., the predetermined rate is complied with in a sufficiently reliable manner. This can also be checked by determining a confidence interval.

In a next step, just like with the detection of anomalies during a normal operating mode (i.e., outside of the learning process), the regions are defined for each of the digital images and, for every region, the value of at least one respective property assigned to the regions is determined. Then, for every digital image, the respective maximum value and/or the minimum value of the property or the relevant properties or the combined value for several properties is determined and assigned to a corresponding sample. This can take place for example by saving all minimum values in a minimum value list and all maximum values in a maximum value list. It should be mentioned that, of course, both alternatives of the method do not have to be used at the same time. If during normal operation only maximum anomalies are detected, i.e., anomalies that are identified as such, when a maximum threshold value is exceeded, then of course only one maximum threshold value is determined.

The same applies to the case that only minimum anomalies are supposed to be detected.

If an adequate number of sample elements (maximum or minimum values for the at least one property or combined property) was determined, then in further step, a probability density function respectively predetermined for the maximum value list or the minimum value list can be parameterized with the use of a statistical estimation method. This corresponds to the fitting of the probability density function to the empirical frequency distribution of the relevant sample.

To this end, the sample can be binned, i.e., the sample elements are each assigned to equally wide, adjacent intervals of the associated value range. The relevant predetermined probability density function can then be fitted to this empirical (relative) frequency distribution, for example by using the least squares method. However, a more advantageous statistical estimation function is typically used here, for example the maximum likelihood method or the moment method.

For the probability density function that must be specified for carrying out the method, such a type should be selected of which it must be assumed that it can describe the sample well when the parameterizing has been carried out. Because in the present case, extreme values are selected for the relevant property and form the respective sample, one will frequently select a type of generalized extreme value distribution or the generalized extreme value distribution (with their three parameters), which combine the Gumbel distribution, the Weibull distribution and the Fréchet distribution. The frequently used Gumbel distribution has the following form:

$$f(x) = \exp\left[-\exp\left(-\frac{x-\mu}{\beta}\right)\right]$$

In this case f denotes the value of the probability density as a function of the random variable x. The value x of the respective random variable in the present case denotes the value of the relevant property or the combined value. The parameters μ and β are determined using the selected statistical method.

Figure 2:
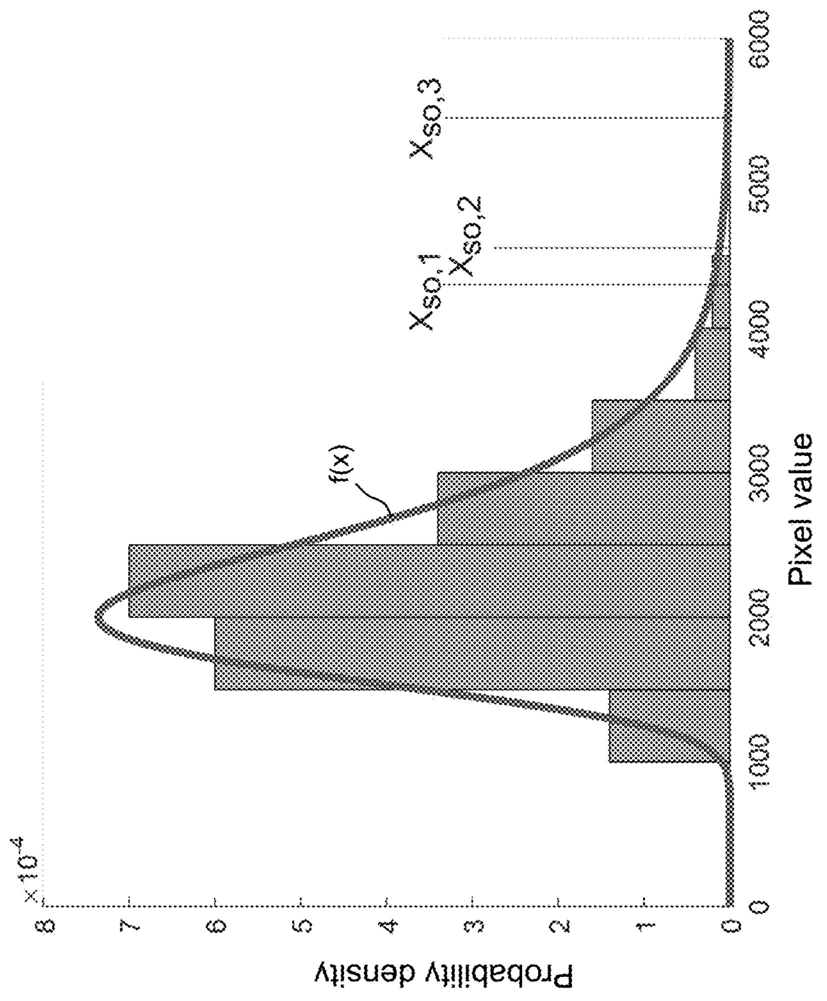
FIG. 2A graph showing the empirical frequency distribution of a sample of maximum values of a property from previously determined regions in digital images of good products, as well as a probability density function fit to it.

FIG. 2 shows a graph, which schematically depicts the fitting of a probability density function f(x) on a relative empirical frequency distribution of maximum pixel values, wherein the pixel value is denoted by x. The pixel values are plotted on the x-axis and the values for the probability density or the relative frequency on the y-axis.

With the probability density function parameterized in this manner, the desired threshold value (for the predetermined rate, with which a maximum anomaly is incorrectly detected in the images being examined or with which no maximum anomaly is correctly identified in the image being examined) can be determined in a further step. To this end, the threshold value is defined so that the area under the parameterized probability density function above the threshold value is equal to the predetermined rate, with which a maximum anomaly is incorrectly detected in the images being examined, or the area under the parametrized probability density function below the threshold value is equal to the predetermined rate, with which no maximum anomaly is correctly identified in the images being examined. This is because this area corresponds to the probability of the occurrence of a maximum value of the relevant property in a digital image, which is greater than or equal to the threshold value. The threshold value can result by converting the equation from the inverse function of the distribution function belong to the to-be-parameterized probability density function, if a closed solution exists for the inverse function. Otherwise, the calculation of the threshold value can take place by means of known and suitable numerical methods.

Threshold values $X_{so,1}$, $X_{so,2}$, and $X_{so,3}$ are plotted in FIG. 2, which correspond to a false reject rate (false positive rate) of 1.0%, 0.6%, and 0.1%, i.e., the areas under the probability density function on the right of these threshold values yield the values of 0.01, 0.006, and 0.001.

If, instead of the desired false positive rate, the true negative rate is specified, then the area under the probability density function below the upper threshold value $X_{so}$ must be used in a corresponding manner for the calculation of the maximum threshold value.

Figure 3:
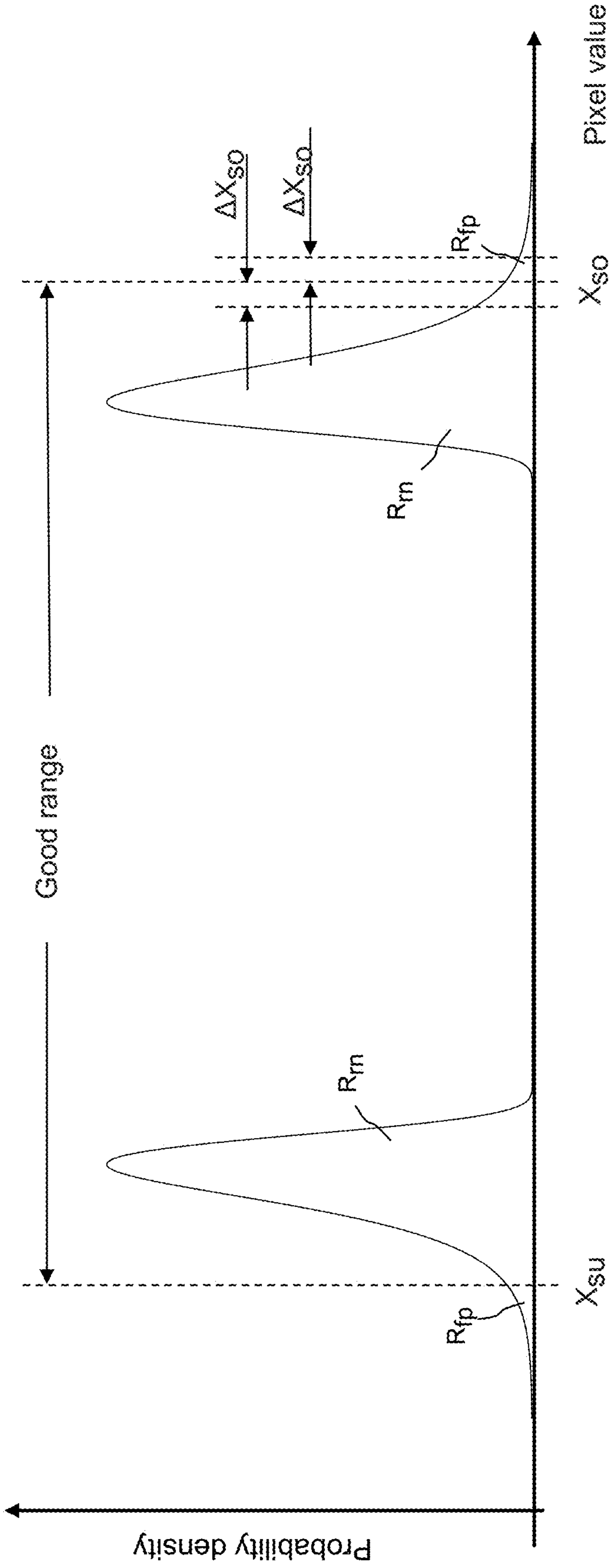
FIG. 3A graph showing respectively a probability density function for minimum and maximum values of a property, which were determined with the use of digital images of good products (or good process products)

A graph similar to FIG. 2 is depicted in FIG. 3, wherein, however, only the progression of the already fitted probability density function is shown. In this example, both a maximum threshold value $X_{so}$ as well as a minimum threshold value $X_{su}$ are determined based on the parameterized probability density function. Here in both cases, i.e., both for the determination of the maximum threshold value as well as for the determination of the minimum threshold value, the same false positive rate $R_{fp}$ is specified, wherein for the determination of the minimum threshold value $X_{su}$ the false positive rate $R_{fp}$ is equal to the area under the probability density function below the minimum threshold value $X_{su}$. Correspondingly, the true negative rate $R_{rn}$ is equal to the area under the probability density function above the minimum threshold value $X_{su}$. This is because a minimum anomaly is then detected, if the value of the relevant property or of the combined value for several properties is less than the relevant minimum threshold value $X_{su}$.

In the case of the parameterized probability density functions according to FIG. 3, a digital image would then be detected as containing an anomaly, if, for at least one region, a value of the property under consideration or a combined value for the relevant properties is yielded that lies outside the good range between the minimum threshold value and the maximum threshold value (or, in other words, if the relevant value is less than or equal to the minimum threshold value $X_{su}$ or greater than or equal to the maximum threshold value $X_{so}$).

Furthermore, a confidence interval for the maximum threshold value $X_{so}$ is plotted in FIG. 3, wherein here for the sake of simplicity a symmetrical confidence interval with the limits $X_{so}-\Delta X_{so}$ and $X_{so}+\Delta X_{so}$ was assumed. In order to reduce the false reject rate with even greater certainty to the desired predetermined value, a secondary maximum threshold value can be used during the detection of anomalies, which is greater by $\Delta X_{so}$ than the determined threshold value $X_{so}$. In the same way, a secondary minimum threshold value can be used, which is less than the determined threshold value $X_{su}$ by the width of a confidence interval $\Delta X_{su}$ for the lower threshold value $X_{su}$. In other words, the secondary maximum threshold value corresponds to the upper limit of the confidence interval for the maximum threshold value and the secondary minimum threshold value corresponds to the lower limit of the confidence interval for the minimum threshold value.

As explained above, the number of digital images for the determination of the threshold value(s) (maximum or minimum threshold value) is fixedly predetermined. However, this number would have to be selected to be so large than a sufficiently reliable threshold value is determined.

The method is suitable for detecting anomalies in images of products, which can be generated in any arbitrary manner and depict the arbitrary properties of the products. In particular, the method is suitable for analyzing the images that are obtained by means of inspection devices, which operate with x-ray or terahertz radiation and in this way are able to generate information about the interior of a product. The method can be implemented in an inspection device in particular via software. The result of the detection method can be used to control additional apparatuses, for example a sorting device.

If the desired maximum or minimum threshold value was determined in the foregoing manner, then the additional method described below follows, which is carried out in a separate test process. The test process can in particular be carried out before the start of productive operation of a system with an x-ray inspection device 100 (or an inspection device designed in any arbitrary manner).

It is again expressly pointed out that determining the desired threshold value(s) in the manner described above is not a mandatory requirement for carrying out the test process described below. In fact, the desired threshold value can also be directly specified, for example by an operating person or by taking the threshold value from a memory, in which the desired maximum threshold value and/or minimum threshold value, assigned to a product type, is stored.

The test process comprises the following steps:

First of all, a plurality of digital bad images is generated, each of which has at least one already known anomaly. Generating the digital bad images can take place in this case with the use of one or more physical bad products, each of which contain one or more already known interfering objects, which generate a corresponding already known anomaly in a digital image (bad image) of the relevant bad product. These types of bad products are produced from good products, in which respectively one or more already known interfering objects are introduced, preferably at a specific position within the good product. This makes it possible, in a bad image produced by means of a bad product created in this way, to search the maximum extreme value or the minimum extreme value, which is generated by the relevant already known anomaly and which, as the maximum sample value or the minimum sample value, is used to determine the detection rate with the use of the method explained below, only in a region of the digital image defined in a suitable manner, which region includes the already known anomaly or in which the relevant interfering object is located (independent of whether the interfering object generates a detectable anomaly in the digital bad image).

Defining the region of digital image to be considered can take place in a variety of ways. For example, the geometric shape of the region (square, circular or the like) can be defined and the size can then be selected so that the interfering object or the anomaly caused by it is located completely within the region.

According to another variant, a basic threshold value can be used, wherein (in the manner already described above) all regions of the bad image are determined whose pixel values for determining a maximum anomaly are greater than (or greater than or equal to) the relevant basic threshold value or for determining a minimum anomaly are less than (or less than or equal to) the relevant basic threshold value. From these regions, the region that includes the interfering object or the already known anomaly caused by it can be used. In doing so, using the information about the position within the bad product or within the relevant bad image and the information about the geometry of the relevant interfering object, a check can also be made to see whether the interfering object or the already known anomaly is included with an adequate portion of the so determined region. This requirement can then be affirmed for example, if the geometric area of the interfering object within the bad image or the area of the already known anomaly caused by it overlap sufficiently, for example with a degree of overlap of more than 50[%] or more than 80%. In this case, the ratio of the area of the interfering object or of the already known anomaly caused by it in the digital bad image and the area of the relevant previously determined region can be used as the degree of overlap.

However, generating bad images can also take place when using at least one previously generated good image, i.e., using at least one digital image of a good product, which preferably corresponds to the same type of products that are supposed to be inspected in a productive operation of the respective inspection device 100. Instead of a single good image, preferably a plurality of good images is used in practice in order to take information about the statistical distribution of the properties of the good images into consideration. Good images of this sort can already be generated during the previously explained learning process (during which a threshold value is determined with the specification of the false reject rate) and be used for the creation of "artificial" bad images. To this end, one or more good images, of course, can be saved in a memory.

To generate an "artificial" bad image of this sort, a virtual interfering object can first be defined, wherein a predetermined material and the geometry of the virtual interfering object are defined. Simple shapes in particular can be used as geometry, for example the shape of a sphere, a cube or a quad. The material of the interfering object can be taken into account in that particularly in the case of inspection methods during which an irradiation of the relevant product takes place, the specific damping of the material is taken into account. Databases or spreadsheets containing the specific damping of a plurality of materials can be used here for the x-ray inspection. In this case, a specific damping is understood as the damping which the relevant radiation experiences when irradiating the material per unit of length (as viewed in the irradiation direction). This additional damping can thus be included in a simple way at the relevant position in the already existing image data of the good image, which is used to create the "artificial" bad image. If the image data of the good image is available in a logarithmic scale, then the inclusion of the additional damping, which is likewise available in a logarithmic scale, can take place by addition.

Regardless of whether physical or virtual interfering objects are used to generate digital bad images, with the exception of the case of spherical interfering objects, the position in which the interfering object is located relative to the direction of the irradiation of the product to be inspected (or more generally, relative to the observation direction of the product) must also be defined. For the inclusion of the additional damping which is generated by the relevant interfering object, the interfering object (more precisely, its projection in a plane perpendicular to the irradiation direction) is divided into pixels (wherein the pixel distribution preferably corresponds to the already existing pixel distribution of the good image). In this way, the inclusion of the additional damping can be undertaken for every individual pixel (i.e., pixel-by-pixel). The "artificial" bad image generated in this way can then be processed in the same way as a bad image that was generated by means of a physical interfering object.

As already indicated above, for an adequate number of bad images generated in this way for every predetermined anomaly that is contained in a bad image, a corresponding maximum sample value or minimum sample value is determined (depending on whether it is a maximum or minimum anomaly). This can take place in the same way as previously described in the case of the determination of a maximum threshold value or minimum threshold value.

A detection rate can be determined from a maximum value sample or minimum value sample that is generated in this way. To do so, according to a first variant, a probability density function can be specified which has a free, non-predetermined parameter. This parameter can then be determined in a suitable manner, in particular with the use of a statistical estimation method, so that the parameterized probability density function optimally describes the respective sample optimal. This parameterization can be carried out in the same way as was previously described in connection with the determination of a maximum threshold value or minimum threshold value.

Figure 4:
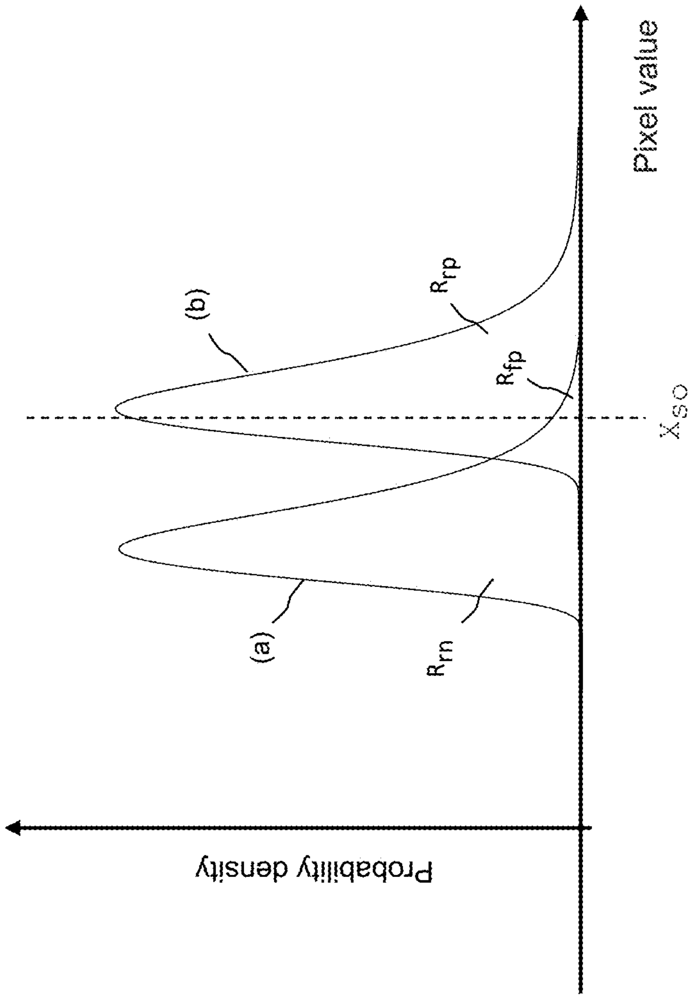
FIG. 4A graph showing a probability density function (curve (a)) for maximum values of a property, which were determined with the use of digital images of good products (or good process products), and a second probability density function (curve (b)) for maximum values of a property, which were determined with the use of digital images of bad products with in each case an already known anomaly.

FIG. 4 shows a graph with two curves, which represent probability density functions, which were parameterized as described above with the use of a generalized extreme value function. The curve (a) shows a probability density function, which was selected and parameterized in the manner described above for the determination of a maximum threshold value with the use of good products (or good process products). The corresponding threshold value $X_{so}$ is determined from this curve with the specification of a value for the false reject rate or the false positive rate $R_{fp}$.

The threshold value $X_{so}$ determined in this way can then be used to determine an estimated value for the detection rate from the second curve (b), which is set in the case of productive operation of the inspection device 100 for the inspection of similar products. As already explained in the foregoing, this estimated value is all the more applicable, the better the interfering objects occurring in practice coincide with the already known interfering objects which were used to determine the relevant maximum value sample or the minimum value sample.

The curve (b) in FIG. 4 shows a probability density function, which was selected and parametrized in the manner described above for a maximum value sample for an already known anomaly. Consequently, a detection rate for the relevant already known anomaly that occurs during the inspection of products of the same type can be determined from this probability density function. For this purpose, only the probability density function of the previously determined maximum threshold value $X_{so}$ to infinity (or a very high value, for example the maximum possible pixel value supplied by the radiation detector value) must be integrated. This integral value corresponds to the true positive rate for a detection of the relevant already known anomaly, i.e., of the detection rate.

This now known detection rate can be evaluated by an operating person or even automatically to the effect of whether the relevant value is acceptable in practice, in particular taking into consideration the consequences that occur in the case of a non-detection of an interfering object. For example, if a food product such as yogurt, cheese, chocolate, cookies or the like is inspected, and if there is a metal or bone splinter therein that is not detected, this could possibly lead to life-threatening injuries for a final consumer who consumes this sort contaminated food. In such a case, the detection rate must satisfy correspondingly strict standards, for example of greater than 99%. In other cases, in which a non-detection can lead to less severe consequences, the detection rate can be set to a considerably lower value of 80% or 90%.

Since the detection rate and the false reject rate or the predetermined maximum threshold value or minimum threshold value are dependent on each other, in many cases it is not possible to simultaneously achieve a desired low false reject rate and a likewise desired high detection rate. A case of this sort is depicted in FIG. 4. As this graph shows, a high maximum threshold value $X_{so}$ or a low false reject rate $R_{fp}$ inevitability leads to a drastically reduced detection rate $R_{rp}$.

Figure 5:
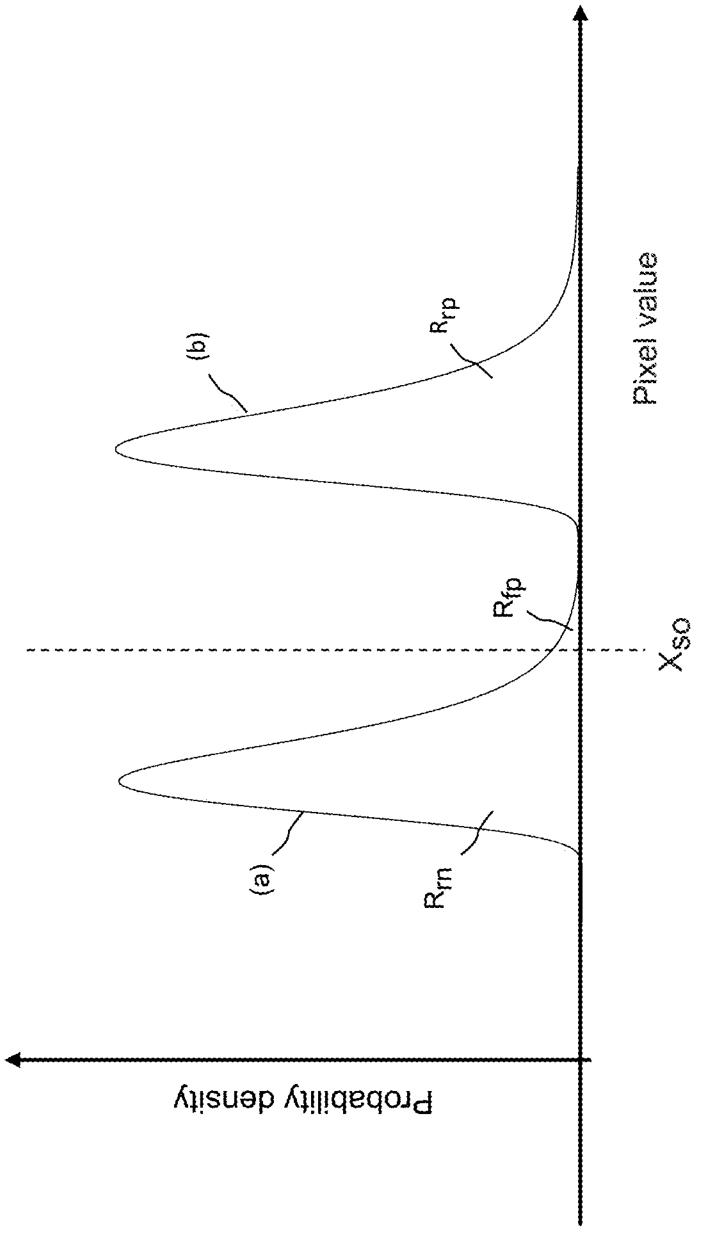
FIG. 5A graph similar to FIG. 4, wherein the curves (a) and (b) have a greater distance on the x-axis so that so a higher detection rate is possible with a simultaneously lower false reject rate.

FIG. 5, on the other hand, shows another case in which the already known maximum anomaly emerges significantly better in a bad image. In this case, curve (b) is offset considerably further to the right i.e., in the direction of larger pixel values as compared to curve (b) in FIG. 4. Consequently, the same maximum threshold value $X_{so}$ or the same false reject rate $R_{fp}$ as in FIG. 4 produces an extremely high detection rate $R_{fp}$ in the case according to FIG. 5.

The two cases according FIGS. 4 and 5 can be produced for example for already known anomalies, which are caused by interfering objects of the same size, but made of different materials. These cases can arise in the same way when the interfering objects are made of the same material, but the interfering object in the case of FIG. 4 is considerably smaller than the interfering object in the case of FIG. 5.

Instead of using a probability density function for describing the maximum value sample or the minimum value sample for determining the detection rate, the respective sample values as such can also be used. The detection rate can be determined in this case in that the number of those sample values that are greater than or equal to the previously determined threshold value is determined. The detection rate is then yielded by dividing the number of sample values determined in this way by the total number of sample values.

In this case as well, it is not necessary to determine the relevant threshold value from a previously predetermined false reject rate. In fact, it is also possible to directly specify the threshold value.

Figure 6:
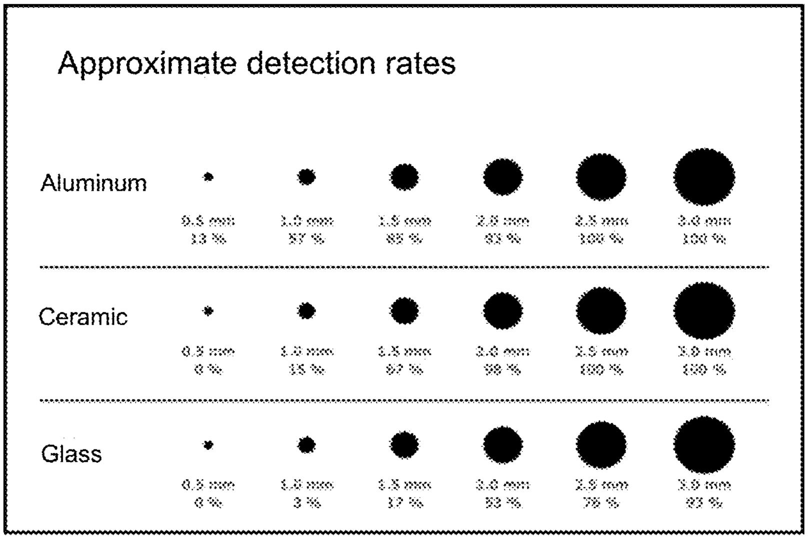
FIG. 6A representation of a display of a display device, wherein respectively six similar interfering objects of various sizes are depicted for three different materials and a numeric value of the detection rate is assigned to each interfering object.

FIG. 6 depicts a display of the display unit 124 of the x-ray inspection device 100, which shows the result of a test process that was carried out as explained in the foregoing.

As this figure shows, the detection rate for spherical interfering objects having different diameters, namely 0.5 mm, 1.0 mm, 1.5 mm, 2.0 mm, 2.5 mm, and 3.0 mm, was respectively determined for three different materials, namely aluminum, ceramic, and glass. The numeric values for the detection rate are depicted assigned to a corresponding schematic representation of the respective interfering object. This display provides an operating person with immediate information about the detection rate for the different materials and sizes of the interfering objects. As FIG. 6 shows, for example, spherical interfering objects made of aluminum with a diameter of 0.5 mm are still identified with a detection rate of 13%, while interfering objects with a corresponding size made of ceramic and glass are no longer identified. Interfering objects made of aluminum or ceramic with a diameter of 2.5 or 3.0 mm are still identified at a rate of 100% in each case, whereas corresponding interfering objects made of glass are only detected with a detection rate of 76% and 93%.

Figure 7:
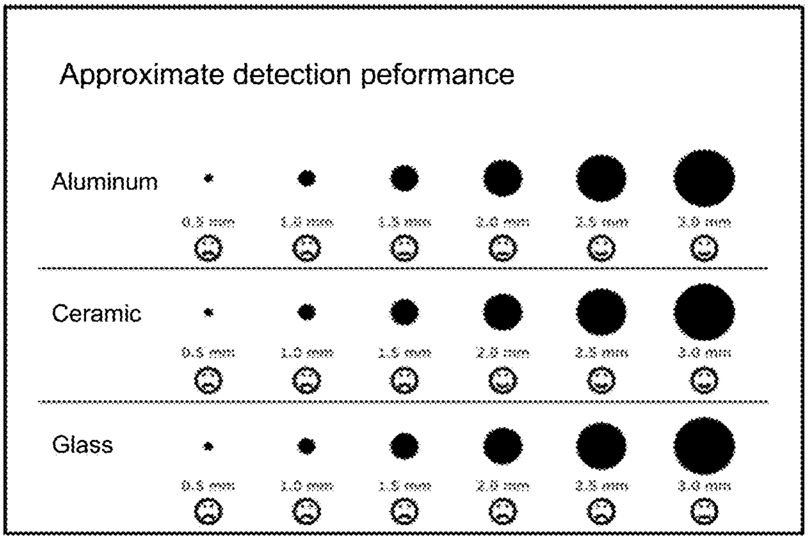
FIG. 7A representation of a display of a display device similar to FIG. 6, wherein a smiley icon for the detection rate is assigned to each interfering object.

FIG. 7 shows another variant of a display, which matches the representation in FIG. 6 to the largest possible extent. Instead of numeric values for the detection rate, in this case a classifier is used however, wherein a detection rate of less than 80% is classified as insufficient, a detection rate between 80% and 90% (limits included) as still acceptable and a detection rate>90% as good. The three different classifier values are depicted using smiley icons. A color code could also be used in the same way, for example green for "good," yellow for "acceptable," and red for "insufficient." A classifier of this sort makes it possible for an operating person to interpret the display or the result of the rest process even more rapidly.

Figure 8:
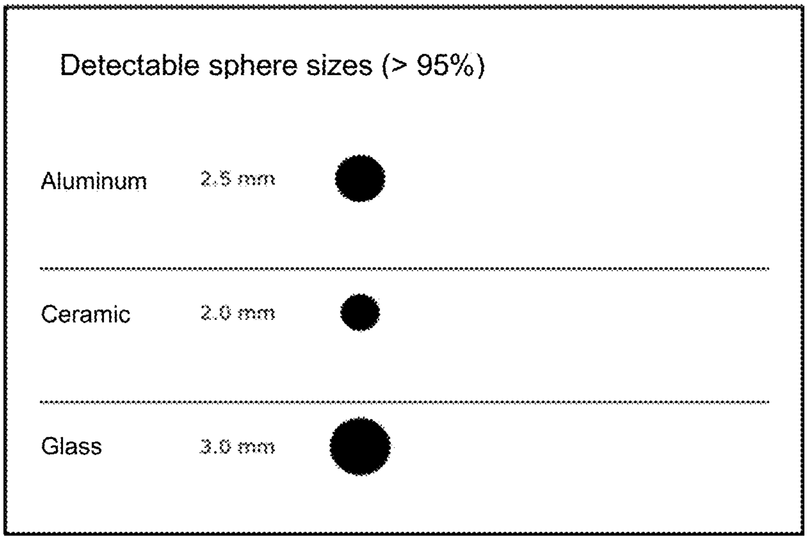
FIG. 8A representation of a display of a display device similar to FIG. 6, wherein for the three different materials respectively only the interfering object sizes are shown that can be detected with a detection rate greater than 95%.

FIG. 8 shows another variant of a display of the display unit 124, wherein in this case the size of spherical interfering objects made of different materials is displayed for which a detection rate that is still classified as good is shown. In the depicted case for spherical interfering objects, there is still good detectability for spherical diameters made of aluminum that are greater than or equal to 2.5 mm, for those made ceramic that are greater than or equal to 2.0 mm, and for those made glass that are greater than or equal to 3.0 mm, wherein in this case as well a graduation of increments of 0.5 mm was assumed for the size of the interfering objects made of the same material during the execution of the test process.

Figure 9:
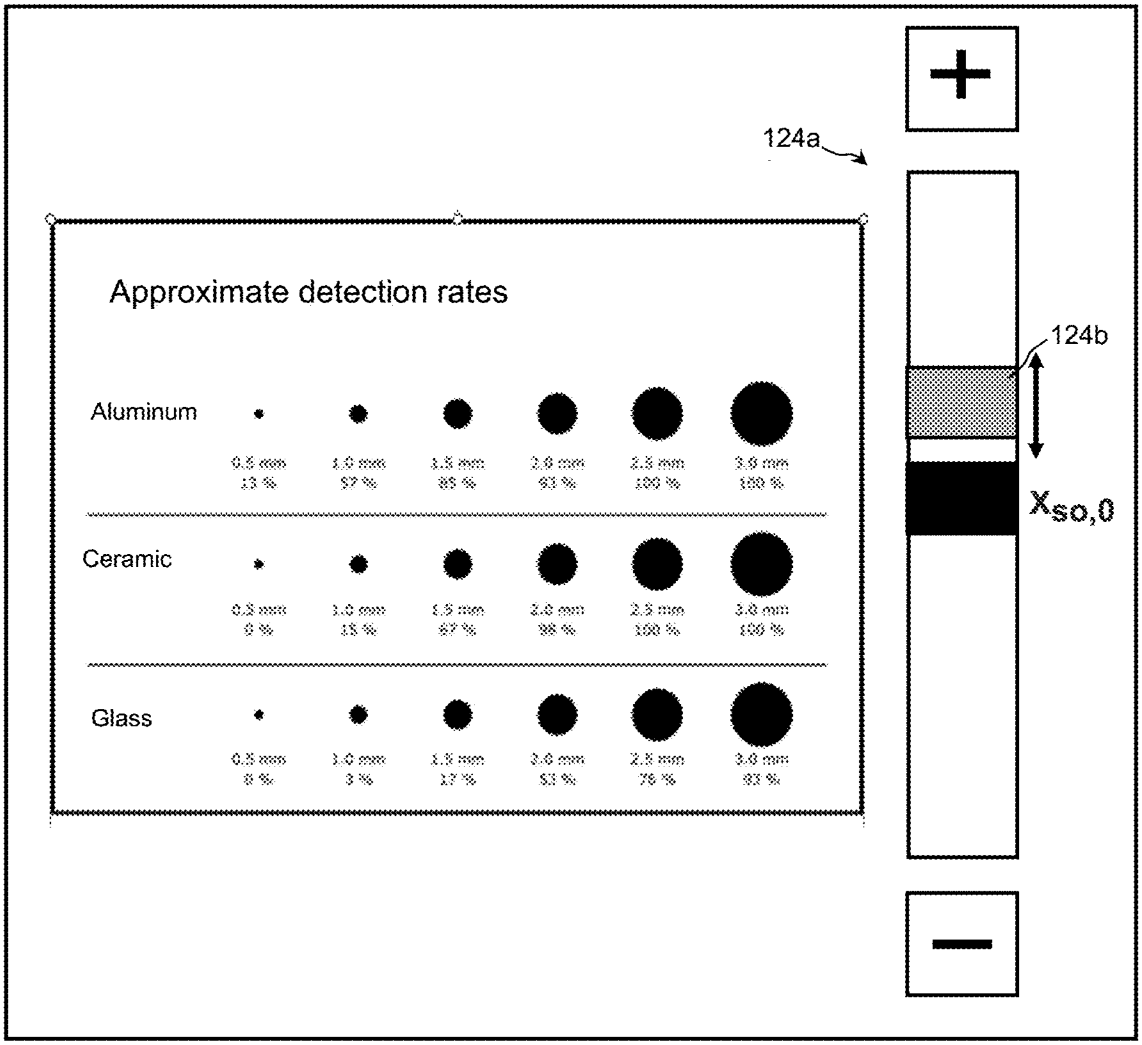
FIG. 9A representation of a display of a display device similar to FIG. 6, wherein an adjusting means for the false reject rate is also provided in the form of a digital slider.

FIG. 9 shows another variant of a display of the display unit 124, which corresponds to a great extent to the display according to FIG. 6. In addition, an adjusting means is specified here for the threshold value $X_{so}$. The adjusting means is embodied as a slider 124*a* in the depicted exemplary embodiment, wherein said slider can be realized in a simple manner by using a touch display for the display unit 124.

In an initial state, a sliding element 124*b* of the slider 124*a* can be located in a starting position in which an initial threshold value $X_{so,0}$ is preset. In this initial state, the detection rate can be determined and displayed for every size and every material of the interfering objects. If an operating person determines that the detection rate for specific sizes and/or specific materials is too low, the operating person can move the slider in the direction of larger values for the threshold value. In the process, new detection rates can be calculated and displayed immediately upon changing the position of the sliding element 124*b*. In this way, the operating person can simply and quickly change the threshold value so that the detection rate is optimal for the respective case.

Of course, instead of the threshold value, a false reject rate can also be adjusted or changed by means of the adjusting means. In this case, the operating person immediately receives information about the, if applicable, strong dependence between the false reject rate and the detection rate, and can adjust the false reject rate for example so that a (still) satisfactory detection rate is yielded.

| List of reference numbers | |
|---|---|
| 100 | X-ray inspection device |
| 102 | Apparatus for detecting anomalies |
| 104 | Product |
| 106 | Conveyance device |
| 108 | Transport belt |
| 110 | Transport belt |
| 112 | Transport belt |
| 114 | Transport belt |
| 116 | Shielding enclosure |
| 118 | X-ray radiation source |
| 120 | X-ray radiation detector |
| 121 | X-ray beam |
| 122 | Image processing unit |
| 124 | Display unit |
| 124a | Slider |
| 124b | Sliding element |
| F | Conveyance direction |
| EDER-2 | |
| $X_{su}$ | Lower threshold value (determination of the threshold value by means of good products or good process products) |
| $Y_{su}$ | Lower threshold value (determination of the threshold value by means of bad products or bad process products) |
| $X_{so}$ | Upper threshold value (determination of the threshold value by means of good products or good process products) |
| $Y_{so}$ | Upper threshold value (determination of the threshold value by means of bad products or bad process products) |
| $\Delta X_{so}$ | Width of the confidence interval for the maximum threshold value |
| $\Delta X_{su}$ | Width of the confidence interval for the minimum threshold value |
| $R_{fp}$ | False positive rate |
| $R_{rn}$ | True negative rate |
| $R_{rp}$ | True positive rate |
| $R_{fn}$ | False negative rate |

What is claimed is:

1. A method for detecting anomalies in digital images of products, wherein every digital image is formed by a plurality of pixels, which are represented by image data, and wherein every pixel represents an assigned location within the relevant image and has a value that characterizes the relevant location, (a) wherein every image to be examined is regarded as a region or is subdivided into two or more regions, which each consist of one or more adjacent pixels, (b) and wherein for every region a value is determined for at least one property or a combined value for several properties of the region, (c) wherein a region is detected as a maximum anomaly if the value of the at least one property or a combined value for several properties of the region is greater than a predetermined maximum threshold value, or wherein a region is detected as a minimum anomaly if the value of the at least one property or a combined value for several properties of the region is less than a predetermined minimum threshold value, characterized in that, (d) the following steps are carried out in a test process:

(i) generating a plurality of digital bad images of real or fictitious bad products, each of which has at least one already known anomaly;

(ii) defining for every bad image, the region or the regions and determining the value of the at least one property or of the combined value for several properties of each region and determining the maximum value of these values as a maximum sample value of a maximum value sample or determining the minimum value of these values as a minimum sample value of a minimum value sample;

(iii) determining a detection rate for the at least one already known anomaly (1) by determining estimated values for all free, non-predetermined parameters of a predetermined probability density function for describing the maximum value sample or the minimum value sample (parametrizing) using the maximum sample values or the minimum sample values and using a statistical estimation method, and (2) by integrating the parameterized probability density function using the predetermined maximum threshold value or minimum threshold value as an integration limit, or (iv) determining a detection rate for the at least one already known anomaly as a ratio of the number of values of the maximum value sample or the minimum value sample, which are greater than or equal to the predetermined maximum threshold value or less than or equal to the predetermined minimum threshold value, and the total number of values of the maximum value sample or of the minimum value sample; and (v) assigning the detection rate to the at least one already known anomaly.

2. The method according to claim 1, characterized in that the maximum threshold value and/or the minimum threshold value is determined in a learning process, in which the following steps are carried out:

(a) generating or using a number of digital images of good products that do not contain an anomaly, or of good process products, which predominantly do not contain an anomaly, wherein the number of images is predetermined or is determined in the course of the learning process;

(b) defining, for each of the digital images, the region or the regions and determining the value of the at least one property or of the combined value for several properties of each region and determining the maximum value of these values as a maximum sample value of a maximum value sample and/or determining the minimum value of these values as a minimum sample value of a minimum value sample;

(c) determining, with the use of a statistical estimation method, the estimated values for all free, non-predetermined parameters of a predetermined probability density function for describing the maximum value sample using the maximum sample values and/or determining the estimated values for all free, non-predetermined parameters of a predetermined probability density function for describing the minimum value sample using the minimum sample values;

(d) specifying a first rate, with which a maximum anomaly is incorrectly detected in the images being examined, or a second rate, with which no maximum anomaly is correctly identified in the images being examined, and/or specifying a third rate, with which a minimum anomaly is incorrectly detected in the images being examined, or a fourth rate, with which no minimum anomaly is correctly identified in the images being examined, (e) determining the maximum threshold value using the probability density function parameterized in accordance with feature (c) or a distribution function corresponding thereto so that the probability of the occurrence of a maximum value that is greater than or equal to the maximum threshold value corresponds to the predetermined first rate or that the probability of the occurrence of a maximum value that is less than or equal to the maximum threshold value corresponds to the predetermined second rate, and/or (f) determining the minimum threshold value using the probability density function parameterized in accordance with feature (c) or a distribution function corresponding thereto so that the probability of the occurrence of a minimum value that is less than or equal to the minimum threshold value corresponds to the predetermined third rate or that the probability of the occurrence of a minimum value that is greater than or equal to the minimum threshold value corresponds to the predetermined fourth rate.

3. The method according to claim 1, characterized in that, (a) defining the region or the regions takes place using a basic threshold value, wherein every isolated pixel and every group of adjacent pixels, whose pixel value is respectively greater than the basic threshold value, are respectively assigned to a region of a first group of regions, and/or wherein every isolated pixel and every group of adjacent pixels, whose pixel value is respectively less than or equal to the basic threshold value, is respectively assigned to a region of a second group of regions, or (b) defining the region or the regions takes place using a geometric mask, in particular a fixedly predetermined mask or a mask generated from the relevant image by means of image processing.

4. The method according to claim 1, characterized in that a geometric property is used as the property of a region that is determined from the location information of the pixels of the region, in particular the area, the circumference or the diameter, or that a pixel value property that is determined from the values of the pixels of the region is used as the property of a region, in particular the maximum value or the minimum value of all pixels of the region, the mean value, the variance or the standard deviation.

5. The method according to claim 1, characterized in that the predetermined probability distribution is the generalized extreme value distribution, in particular of its special cases, the Gumbel distribution, the Weibull distribution or the Fréchet distribution.

6. The method according to claim 1, characterized in that the at least one predetermined anomaly is located at a predetermined position in the bad image and that this information and optionally also the geometry of an interfering object causing this predetermined anomaly are used for determining the maximum sample value or minimum sample value representing this predetermined anomaly.

7. The method according to claim 1, characterized in that, (a) to generate a bad image, a good product that does not contain an anomaly is used, wherein on or in the good product at least one interfering object or a carrier with at least one interfering object arranged thereon is provided, which generates at least one predetermined anomaly in the bad image, or (b) to generate a bad image, digital image data of a good product are used, wherein the digital image data of the good product are digitally transformed with the use of known material and geometric properties of at least one predetermined interfering object for the inclusion of the at least one interfering object.

8. The method according to claim 7, characterized in that the carrier for the at least one interfering object is embodied to be plate-shaped or card-shaped and that several interfering objects having identical material properties, in particular from a single material, with similar geometry, but of a different size, are arranged in or on the carrier.

9. The method according to claim 7, characterized in that the at least one interfering object is a sphere made of a predetermined material.

10. The method according to claim 1, characterized in that the detection rate is displayed on a display device as a numeric value or a therewith related variable or identification.

11. The method according to claim 10, characterized in that the detection rate is shown assigned to a graphic representation of the at least one interfering object and/or to the associated bad image.

12. The method according to claim 10, characterized in that the maximum threshold value or minimum threshold value or the first, second, third or fourth rate can be changed by means of an input means or an adjusting means, for example a slider or rotary knob, and that a current value for the detection rate is displayed on the display device for every current value for the maximum threshold value or the minimum threshold value or the first, second, third or fourth rate.

13. The method according to claim 11, characterized in that the detection rate is evaluated by means of a classifier, for example with a color code.

14. An apparatus for detecting anomalies in digital images of products, in particular an x-ray inspection device, with a data processing device, which is embodied to receive and process digital image data from digital images of products, characterized in that the data processing device is embodied to carry out the method according to claim 1.

* * * * *